(12) United States Patent
Cathelin et al.

(10) Patent No.: US 10,494,517 B1
(45) Date of Patent: Dec. 3, 2019

(54) HETEROPHASIC PROPYLENE COPOLYMERS

(71) Applicant: BASELL POLIOLEFINE ITALIA S.R.L., Milan (IT)

(72) Inventors: Caroline Cathelin, Ferrara (IT); Paola Massari, Ferrara (IT); Claudio Cavalieri, Ferrara (IT); Marco Ciarafoni, Ferrara (IT); Roberto Pantaleoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/466,453

(22) PCT Filed: Nov. 27, 2017

(86) PCT No.: PCT/EP2017/080509
§ 371 (c)(1),
(2) Date: Jun. 4, 2019

(87) PCT Pub. No.: WO2018/104092
PCT Pub. Date: Jun. 14, 2018

(30) Foreign Application Priority Data

Dec. 5, 2016 (EP) .................................... 16202191

(51) Int. Cl.
| | |
|---|---|
| *C08L 23/12* | (2006.01) |
| *C08F 110/06* | (2006.01) |
| *C08F 210/02* | (2006.01) |
| *C08F 210/06* | (2006.01) |
| *C08F 4/649* | (2006.01) |
| *C08F 4/52* | (2006.01) |
| *C08L 23/14* | (2006.01) |
| *C08F 4/642* | (2006.01) |

(52) U.S. Cl.
CPC .............. *C08L 23/12* (2013.01); *C08F 4/52* (2013.01); *C08F 4/6425* (2013.01); *C08F 4/6493* (2013.01); *C08F 110/06* (2013.01); *C08F 210/02* (2013.01); *C08F 210/06* (2013.01); *C08L 23/14* (2013.01); *C08L 2203/16* (2013.01); *C08L 2205/02* (2013.01)

(58) Field of Classification Search
CPC ...... C08L 23/12; C08L 23/14; C08L 2203/16; C08L 2205/02; C08F 4/52; C08F 4/6425; C08F 4/6493; C08F 110/06; C08F 210/02; C08F 210/06
See application file for complete search history.

(56) References Cited

U.S. PATENT DOCUMENTS

| | | | |
|---|---|---|---|
| 9,758,657 B2 | 9/2017 | Rohrmann et al. | |
| 2007/0117932 A1* | 5/2007 | De Palo et al. | B32B 1/08 525/240 |
| 2013/0344267 A1* | 12/2013 | Frederick et al. | B65D 1/0207 428/35.7 |
| 2017/0210893 A1* | 7/2017 | Ciarafoni et al. | C08L 23/12 |

FOREIGN PATENT DOCUMENTS

| | | |
|---|---|---|
| CN | 105051100 A | 11/2015 |
| WO | 2012/049204 A1 | 4/2012 |
| WO | 2015/169831 A1 | 11/2015 |

OTHER PUBLICATIONS

International Search Report and Written Opinion dated Jan. 23, 2018 (Jan. 23, 2018) for Corresponding PCT/EP2017/080509.

* cited by examiner

*Primary Examiner* — Nathan M Nutter

(57) ABSTRACT

A film made from or containing a polypropylene composition made from or containing:
A) from 50 wt % to 90 wt %; of a propylene homopolymer; and
B) from 10 wt % to 50 wt %; of a copolymer of propylene with from 30.0 wt % to 70.0 wt %, of ethylene derived units, based upon the weight of the copolymer;
wherein
the sum of the amount of component A) and B) being 100;
the polypropylene composition having:
i) an intrinsic viscosity of the fraction soluble in xylene at 25° C. between 2.2 to 4.0 dl/g;
ii) a MFR L (Melt Flow Rate according to ISO 1133, condition L, at 230° C. and 2.16 kg load) from 0.5 to 50 g/10 min; and
iii) a xylene soluble fraction ranging from 20 wt % to 50 wt %, based upon the weight of the polypropylene composition; and
the polypropylene composition being obtained by a polymerization process wherein the catalyst system contains bismuth.

10 Claims, No Drawings

HETEROPHASIC PROPYLENE COPOLYMERS

This application is the U.S. National Phase of PCT International Application PCT/EP2017/080509, filed Nov. 27, 2017, claiming benefit of priority to European Patent Application No. 16202191.9, filed Dec. 5, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a film made from or containing an heterophasic propylene copolymer.

BACKGROUND OF THE INVENTION

Polypropylene is the material of choice for many applications. Some polypropylene compositions are used in films.

SUMMARY OF THE INVENTION

In a general embodiment, the present disclosure provides a film made from or containing a polypropylene composition made from or containing:

A) from 50 wt % to 90 wt %, of a propylene homopolymer having a fraction insoluble in xylene at 25° C., higher than 90%, and a MFR L (Melt Flow Rate according to ISO 1133, condition L, at 230° C. and 2.16 kg load) from 0.5 to 200 g/10 min; and B) from 10 wt % to 50 wt %; of a copolymer of propylene and ethylene having from 30.0 wt % to 70.0 wt %, of ethylene derived units, based upon the total weight of the copolymer;

wherein the sum of the amount of component A) and B) being 100;

the polypropylene composition having:

i) an intrinsic viscosity of the fraction soluble in xylene at 25° C. between 2.2 to 4.0 dl/g;

ii) a MFR L (Melt Flow Rate according to ISO 1133, condition L, at 230° C. and 2.16 kg load) from 0.5 to 50 g/10 min; and iii) a xylene soluble fraction ranging from 20 wt % to 50 wt %, based upon the total weight of the polypropylene composition; and the polypropylene composition being obtained by a polymerization process including:

step a) polymerizing propylene to obtain component A) in the presence of a catalyst made from or containing the product of a reaction between:

a) a solid catalyst component made from or containing Ti, Mg, Cl, and an internal electron donor compound containing from 0.1 to 50% wt of Bi with respect to the total weight of the solid catalyst component;

b) an alkylaluminum compound and, c) an electron-donor compound (external donor); and step b) polymerizing propylene and ethylene to obtain component B) in the presence of the polymerization product of step a).

DETAILED DESCRIPTION OF THE INVENTION

In some embodiments, the present disclosure provides a film made from or containing a polypropylene composition made from or containing:

A) from 50 wt % to 90 wt %; alternatively from 60 wt % to 85 wt %; alternatively from 67 wt % to 82 wt %, of a propylene homopolymer having a fraction insoluble in xylene at 25° C., higher than 90%, alternatively higher than 95%, alternatively higher than 97%; and a MFR L (Melt Flow Rate according to ISO 1133, condition L, at 230° C. and 2.16 kg load) from 0.5 to 200 g/10 min, alternatively from 10 to 110 g/10 min, alternatively from 30 to 70 g/10 min; and B) from 10 wt % to 50 wt %; alternatively from 15 wt % to 40 wt %; alternatively from 18 wt % to 33 wt %, of a copolymer of propylene and ethylene having from 30.0 wt % to 70.0 wt %, alternatively from 35.0 wt % to 60.0 wt %, alternatively from 40.0 wt % to 58.0 wt %, alternatively from 52 wt % to 57 wt % of ethylene derived units, based upon the total weight of the copolymer;

wherein the sum of the amount of component A) and B) being 100; and the polypropylene composition having:

i) an intrinsic viscosity of the fraction soluble in xylene at 25° C. between 2.2 to 4.0 dl/g; alternatively between 2.3 to 4.0 dl/g, alternatively between 2.5 and 3.5 dl/g;

ii) a MFR L (Melt Flow Rate according to ISO 1133, condition L, at 230° C. and 2.16 kg load) from 0.5 to 50 g/10 min, alternatively from 8 to 40 g/10 min, alternatively from 10 to 30 g/10 min; and iii) a xylene soluble fraction ranging from 20 wt % to 50 wt %; alternatively from 25 wt % to 35 wt %, based upon the total weight of the polypropylene composition; and the polypropylene composition being obtained by a polymerization process including:

step a) polymerizing propylene to obtain component A) in the presence of a catalyst made from or containing the product of a reaction between:

a) a solid catalyst component made from or containing Ti, Mg, Cl, and an internal electron donor compound containing from 0.1 to 50% wt of Bi with respect to the total weight of the solid catalyst component;

b) an alkylaluminum compound and, c) an electron-donor compound (external donor); and step b) polymerizing propylene and ethylene to obtain component B) in the presence of the polymerization product of step a).

As used herein, the term "copolymer" refers to polymers containing two kinds of comonomers.

In some embodiments, a film is a cast film or a biaxially oriented film (BOPP).

In some embodiments, the film is used for packaging, alternatively food packaging.

In some embodiments, the polyolefin composition is prepared by a process including homopolymerizing propylene in a first stage and then copolymerizing propylene with ethylene in a second, wherein both stages occur in the presence of a catalyst made from or containing the product of a reaction between:

a) a solid catalyst component made from or containing Ti, Mg, Cl, and an electron donor compound containing from 0.1 to 50% wt of Bi with respect to the total weight of the solid catalyst component;

b) an alkylaluminum compound and, c) an electron-donor compound (external donor).

In some embodiments, in the catalyst component the content of Bi ranges from 0.5 to 40%, alternatively from 1 to 35, alternatively from 2 to 25% wt, alternatively from 2 to 20% wt, based upon the total weight of the solid catalyst component.

In some embodiments, the particles of the solid component have substantially spherical morphology and average diameter ranging between 5 and 150 alternatively from 20 to 100 alternatively from 30 to 90 In the present description, the term "substantially spherical morphology" as used herein refers to particles having the ratio between the greater axis and the smaller axis equal to or lower than 1.5, alternatively lower than 1.3.

In some embodiments, the amount of Mg ranges from 8 to 30%, alternatively from 10 to 25% wt, based upon the total weight of the solid catalyst component.

In some embodiments, the amount of Ti ranges from 0.5 to 5%. alternatively from 0.7 to 3% wt, based upon the total weight of the solid catalyst component.

In some embodiments, the internal electron donor compounds are selected from alkyl and aryl esters of optionally substituted aromatic polycarboxylic acids such as esters of benzoic and phthalic acids, In some embodiments, the esters are selected from the group consisting of n-butylphthalate, di-isobutylphthalate, di-n-octylphthalate, ethyl-benzoate and p-ethoxy ethyl-benzoate.

In some embodiments, the Mg/Ti molar ratio is equal to, or higher than, 13, alternatively in the range 14-40, alternatively from 15 to 40. In some embodiments, the Mg/donor molar ratio is higher than 16, alternatively higher than 17, alternatively ranging from 18 to 50.

In some embodiments, Bi atoms derive from one or more Bi compounds not having Bi-carbon bonds. In some embodiments, the Bi compounds are selected from the group consisting of Bi halides, Bi carbonate, Bi acetate, Bi nitrate, Bi oxide, Bi sulfate, and Bi sulfide. In some embodiments, the Bi compounds have valence $3^+$. In some embodiments, the Bi compounds are selected from the group consisting of Bi trichloride and Bi tribromide. In some embodiments, the Bi compound is $BiCl_3$.

In some embodiments, the solid catalyst component is prepared by reacting a titanium compound of formula $Ti(OR)_{q-y}X_y$, where q is the valence of titanium and y is a number between 1 and q with a magnesium chloride deriving from an adduct of formula $MgCl_2.pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct thereby creating an emulsion which is quickly quenched causing the solidification of the adduct in form of spherical particles. In some embodiments, the procedure for the preparation of the spherical adducts is as disclosed in U.S. Pat. Nos. 4,399,054 and 4,469,648. In some embodiments, the adduct is directly reacted with Ti compound or subjected to thermal controlled dealcoholation (80-130° C.), thereby obtaining an adduct in which the number of moles of alcohol is lower than 3, alternatively between 0.1 and 2.5. In some embodiments, the reaction with the Ti compound is carried out by suspending the adduct (dealcoholated or as such) in cold $TiCl_4$; the mixture is heated up to 80-130° C. and kept at this temperature for 0.5-2 hours. In some embodiments, the temperature of the cold $TiCl_4$ is about 0° C. In some embodiments, the treatment with $TiCl_4$ is carried out one or more times. In some embodiments, the electron donor compound is added during the treatment with $TiCl_4$.

Several ways are available to add one or more Bi compounds in the catalyst preparation. In some embodiments, a Bi compound is incorporated directly into the $MgCl_2.pROH$ adduct during the adduct's preparation. In some embodiments, the Bi compound is added at the initial stage of adduct preparation by mixing the Bi compound together with $MgCl_2$ and the alcohol. In some embodiments, the Bi compound is added to the molten adduct before the emulsification step. The amount of Bi introduced ranges from 0.1 to 1 mole per mole of Mg in the adduct. In some embodiments, the Bi compounds which are incorporated directly into the $MgCl_2.pROH$ adduct are Bi halides. In some embodiments, the Bi compound is $BiCl_3$.

In some embodiments, the alkyl-Al compound (ii) is selected from the group consisting of trialkyl aluminum compounds, alkylaluminum halides, alkylaluminum hydrides and alkylaluminum sesquichlorides. In some embodiments, the alkyl-Al compound (ii) is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound (ii) is an alkylaluminum sesquichlorides selected from the group consisting of $AlEt_2Cl$ and $Al_2Et_3Cl_3$. In some embodiments, the alkyl-Al compound (ii) is a mixture including trialkylaluminums. In some embodiments, the Al/Ti ratio is higher than 1, alternatively between 50 and 2000.

In some embodiments, the external electron-donor compounds are selected from the group consisting of silicon compounds, ethers, esters, amines, heterocyclic compounds, and ketones. In some embodiments, the external electron-donor compound is 2,2,6,6-tetramethylpiperidine.

In some embodiments, the external donor compounds are silicon compounds of formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms. In some embodiments, the external electron-donor compounds are silicon compounds wherein a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group. In some embodiments, $R_8$ is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)-(2-ethylpiperidinyl)-dimethoxysilane, and methyl(3,3,3-trifluoro-n-propyl)dimethoxysilane. In some embodiments, the external electron-donor compounds are silicon compounds wherein a is 0, c is 3, $R_7$ is a branched alkyl or cycloalkyl group, optionally containing heteroatoms. In some embodiments, $R_8$ is methyl. In some embodiments, the silicon compounds are selected from the group consisting of cyclohexyltrimethoxysilane, t-butyltrimethoxysilane and thexyltrimethoxysilane.

In some embodiments, the electron donor compound (iii) is used in an amount to give a molar ratio between the alkylaluminum compound (ii) and the electron donor compound (iii) of from 0.1 to 500, alternatively from 1 to 300 and alternatively from 3 to 100.

In some embodiments, the polymerization processes are carried out in gas-phase operating in one or more fluidized or mechanically agitated bed reactors, slurry polymerization using as diluent an inert hydrocarbon solvent, or bulk polymerization using the liquid monomer as a reaction medium. In some embodiments, the liquid monomer is propylene. In some embodiments, the polypropylene composition of the present disclosure is obtained with a polymerization process in two or more stages wherein component A) is obtained in a first stage and then component B) is obtained in a second stage in the presence of component A).

In some embodiments, the polymerization is carried out at temperature of from 20 to 120° C., alternatively from 40 to 80° C. In some embodiments, when the polymerization is carried out in gas-phase, the operating pressure is between 0.5 to 5 MPa, alternatively between 1 to 4 MPa. In some embodiments, when the polymerization is carried out in bulk polymerization, the operating pressure is between 1 to 8 MPa, alternatively between 1.5 to 5 MPa. In some embodiments, hydrogen is used as a molecular weight regulator.

In some embodiments, the polypropylene compositions also contain additives. In some embodiments, the additives are selected from the group consisting of antioxidants, light stabilizers, heat stabilizers, nucleating agents, colorants and fillers.

The following examples are given to illustrate and not to limit the present disclosure.

EXAMPLES

Determination of Mg, Ti

The determination of Mg and Ti content in the solid catalyst component has been carried out via inductively coupled plasma emission spectroscopy on "I.C.P Spectrometer ARL Accuris".

The sample was prepared by analytically weighing, in a "Fluxy" platinum crucible", 0.1÷0.3 grams of catalyst and 2 grams of lithium metaborate/tetraborate 1/1 mixture. After addition of some drops of KI solution, the crucible was inserted in a "Claisse Fluxy" for the complete burning. The residue was collected with a 5% v/v $HNO_3$ solution and then analyzed via ICP at the following wavelengths: Magnesium, 279.08 nm; Titanium, 368.52 nm.

Determination of Bi

The determination of Bi content in the solid catalyst component was carried out via inductively coupled plasma emission spectroscopy on "I.C.P Spectrometer ARL Accuris".

The sample was prepared by analytically weighing in a 200 $cm^3$ volumetric flask 0.1÷0.3 grams of catalyst. After slow addition of both about 10 milliliters of 65% v/v $HNO_3$ solution and about 50 $cm^3$ of distilled water, the sample underwent a digestion for 4÷6 hours. Then the volumetric flask was diluted to the mark with deionized water. The resulting solution was directly analyzed via ICP at the following wavelength: Bismuth, 223.06 nm.

Determination of Internal Donor Content

The determination of the content of internal donor in the solid catalytic compound was done through gas chromatography. The solid component was dissolved in acetone, an internal standard was added, and a sample of the organic phase was analyzed in a gas chromatograph, to determine the amount of donor present at the starting catalyst compound.

Determination of X.I.

The Xylene Soluble fraction was measured according to ISO 16152, 2005, but with the following deviations (the ISO 16152-specified feature is within the parentheses)

The solution volume was 250 ml (200 ml).

The sample was precipitated at 25° C. for 30 min During the final 10 minutes, the solution was under agitation by a magnetic stirrer (30 min, without any stirring at all).

The final drying step was done under vacuum at 70° C. (100° C.).

The content of the xylene-soluble fraction is expressed as a percentage of the original 2.5 grams and then, by difference (complementary to 100), the X.I. %

Intrinsic Viscosity (I.V.)

Determined in tetrahydronaphthalene at 135° C.

Molecular Weight Distribution (Mw/Mn)

Molecular weights and molecular weight distribution were measured at 150° C. using a Waters Alliance GPCV/2000 instrument equipped with four mixed-bed columns PLgel Olexis having a particle size of 13 µm. The dimensions of the columns were 300×7.8 mm. The mobile phase used was vacuum distilled 1,2,4-trichlorobenzene (TCB) and the flow rate was kept at 1.0 ml/min. The sample solution was prepared by heating the sample under stirring at 150° C. in TCB for one to two hours. The concentration was 1 mg/ml. To prevent degradation, 0.1 g/l of 2,6-di-tert-butyl-p-cresol were added. 300 µl (nominal value) of solution were injected into the column set. A calibration curve was obtained using 10 polystyrene standard samples (EasiCal kit by Agilent) with molecular weights in the range from 580 to 7 500 000. It was assumed that the K values of the Mark-Houwink relationship were:

$K=1.21\times10^{-4}$ dl/g and $a=0.706$ for the polystyrene standards, $K=1.90\times10^{-4}$ dl/g and $a=0.725$ for the experimental samples.

A third order polynomial fit was used to interpolate the experimental data and obtain the calibration curve. Data acquisition and processing was done by using Waters Empowers 3 Chromatography Data Software with GPC option.

Melt Flow Rate (MFR L)

The melt flow rate MFR L of the polymer was determined according to ISO 1133, condition L (230° C., 2.16 Kg).

$^{13}C$ NMR of Propylene/Ethylene Copolymers $^{13}C$ NMR spectra were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as internal reference at 29.9 ppm. The samples were dissolved in 1,1,2,2-tetrachloroethane-d2 at 120° C. with a 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made as described in "Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150, using the following equations:

$PPP = 100\ T_{\beta\beta}/S \quad PPE = 100\ T_{\beta\delta}/S \quad EPE = 100\ T_{\delta\delta}/S$
$PEP = 100\ S_{\beta\beta}/S \quad PEE = 100\ S_{\beta\delta}/S \quad EEE = 100\ (0.25\ S_{\gamma\delta} + 0.5\ S_{\delta\delta})/S$ $$S=T_{\beta\beta}+T_{\beta\delta}+T_{\delta\delta}+S_{\beta\beta}+S_{\beta\delta}+0.25S_{\gamma\delta}+0.5S_{\delta\delta}$$

The molar percentage of ethylene content was evaluated using the following equation:

E % mol=100*[PEP+PEE+EEE]. The weight percentage of ethylene content was evaluated using the following equation:

$$E\% \text{ wt.} = \frac{100 * E\% \text{ mol} * MW_E}{E\% \text{ mol} * MW_E + P\% \text{ mol} * MW_P}$$

where P % mol is the molar percentage of propylene content, while $MW_E$ and $MW_P$ are the molecular weights of ethylene and propylene, respectively.

The product of reactivity ratio $r_1r_2$ was calculated according to C. J. Carman, R. A. Harrington and C. E. Wilkes, Macromolecules, 1977; 10, 536 as:

$$r_1r_2 = 1 + \left(\frac{EEE + PEE}{PEP} + 1\right) - \left(\frac{P}{E} + 1\right)\left(\frac{EEE + PEE}{PEP} + 1\right)^{0.5}$$

The tacticity of Propylene sequences was calculated as mm content from the ratio of the PPP mmT$_{\beta\beta}$ (28.90-29.65 ppm) and the whole T$_{\beta\beta}$ (29.80-28.37 ppm).

The ethylene content of component B) was calculated from the total ethylene content by using the formula: Ethylene(B wt %)=Ethylene(tot wt %)/(amount B wt %)/100)

Determination of the regioinvertions: determined by means of $C^{13}$-NMR according to the methodology described by J.C. Randall in "Polymer sequence determination Carbon 13 NMR method", Academic Press 1977. The content of regioinvertions was calculated on the basis of the relative concentration of $S_{\alpha\beta}+S_{\beta\beta}$ methylene sequences.

Melting Temperature Via Differential Scanning Calorimetry (DSC)

The melting points of the polymers (Tm) were measured by Differential Scanning calorimetry (D.S.C.) on a Perkin Elmer DSC-1 calorimeter, calibrated against indium melting points, and according to ISO 11357-1, 2009 and 11357-3, 2011, at 20° C./min. The weight of the samples in DSC crucibles was kept at 6.0±0.5 mg.

To obtain the melting point, the weighed sample was sealed into aluminum pans and heated to 200° C. at 20° C./minute. The sample was kept at 200° C. for 2 minutes, then cooled to 5° C. at 20° C./minute. After standing 2 minutes at 5° C., the sample was heated for the second run time to 200° C. at 20° C./min. In this second heating run, the peak temperature (Tp,m) was taken as the melting temperature.

Oligomer Content

The determination of oligomer content by solvent extraction consisted of treating 5 g of polypropylene sample with 10 ml of methylenedichloride ($CH_2Cl_2$) in an ultrasonic bath at 25° C. for 4 hours. 1 μl of the extracted solution was injected into capillary column and analyzed by using FID, without any filtration. For quantitative estimation of oligomer content a calibration based on external standard method was applied. A series of hydrocarbon (C12-C22-C28-C40) was used.

Flexural Modulus

Determined according to ISO 178 and supplemental condition according to ISO 1873-2 with specimen injection molded.

Elmendorf

Measured according to ASTM D1922-15

Example 1

Procedure for the Preparation of the Spherical Adduct

Microspheroidal $MgCl_2.pC_2H_5OH$ adduct was prepared according to the method described in Comparative Example 5 of Patent Cooperation Treaty Publication No. WO98/44009, with the difference that $BiCl_3$ in a powder form and in the amount of 3 mol % with respect to the magnesium being added before feeding of the oil.

Procedure for the Preparation of the Solid Catalyst Component

Into a 500 ml round bottom flask, equipped with mechanical stirrer, cooler and thermometer 300 ml of $TiCl_4$ were introduced at room temperature under nitrogen atmosphere. After cooling to 0° C., while stirring, diisobutylphthalate and 9.0 g of the spherical adduct were sequentially added into the flask. The amount of charged internal donor was to meet a Mg/donor molar ratio of 8. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The solid was then dried under vacuum and analyzed.

Prepolymerization Treatment

Before introducing the solid catalyst component into the polymerization reactors, the solid catalyst component was contacted with triethyl aluminum (TEAL) and Dicyclopentyldimethoxysilane (DCPMS, D donor) in a ratio reported in Table 1. Then the resulting mixture was subjected to prepolymerization as reported in Table 1.

Polymerization

The polymerization run was carried out in continuous mode in a series of two reactors equipped with devices to transfer the product from a first reactor to a second reactor immediately next to the first reactor. The two reactors were fluidized bed gas-phase reactors. A propylene homopolymer was prepared in the first gas-phase reactor while an propylene ethylene copolymer was prepared in the second gas-phase reactor in the presence of the propylene homopolymer coming from the first reactor. Hydrogen was used as molecular weight regulator.

The gas phase (propylene, ethylene and hydrogen) was continuously analyzed via gas-chromatography.

At the end of the run the powder was discharged and dried under a nitrogen flow.

The main polymerization conditions and the analytical data relating to the polymers produced in the reactors are reported in Table 1. Properties of the polymer are reported in Table 2.

Comparative Example 2

Preparation of the Solid Catalyst Component

The catalyst of comparative example 2 was produced by using the same method used for preparing catalyst of example 1 but without using bismuth.

Prepolymerization Treatment

Prepolymerization treatment was carried out according to the procedure of example 1.

Polymerization

The polymerization was carried out by using the same procedure of example 1. The main polymerization conditions and the analytical data relating to the polymers produced in the reactors are reported in Table 1. Properties of the polymer are reported in Table 2.

TABLE 1

| PROCESS CONDITIONS | Ex. 1 | Ex 2 | Comp Ex. 3 |
|---|---|---|---|
| Precontact | | | |
| Temperature ° C. | 20 | 20 | 20 |
| Residence time (min) | 9 | 9 | 9 |
| Teal/donor ratio | 5 | 5 | 5 |
| Prepolymerization | | | |
| Temperature ° C. | 10 | 10 | 10 |
| Residence time (min) | 14 | 14 | 14 |
| first gas phase reactor - propylene homopolymer | | | |
| Temperature, ° C. | 80 | 80 | 80 |
| Pressure, bar | 18 | 18 | 18 |
| Residence time, min | 58 | 52 | 49 |
| H2/C3 mol/mol | 0.056 | 0.056 | 0.03 |
| Split, wt % | 75 | 75 | 75 |
| second gas-phase reactor - ethylene/propylene copolymerization | | | |
| Temperature, ° C. | 75 | 75 | 75 |
| Pressure, bar | 14 | 14 | 14 |
| Residence time, min | 52 | 57 | 44 |
| H2/C2 mol/mol | 0.1 | 0.1 | 0.08 |
| C2/C2 + C3 mol/mol | 0.41 | 0.26 | 0.4 |
| split wt % | 25 | 25 | 27 |

C2- = ethylene; C3- = propylene; H2 = hydrogen

Cast film with a thickness of 50 μm was prepared by extruding each test composition in a single screw Collin extruder (length/diameter ratio of screw 1:25) at a film drawing speed of 7 m/min and a melt temperature of 210-250° C. The Elmendorf test were carried out on the samples. The results are reported in Table 2.

TABLE 2

| | | Example | | |
|---|---|---|---|---|
| | | Ex 1 | Ex 2 | Comp ex 3 |
| Component A) | | | | |
| Homopolymer content | % | 73 | 74 | 73 |
| MFR "L" | g/10' | 57 | 55 | 55 |
| Xylene soluble fraction | wt % | 2.0 | 2.0 | 2.5 |
| Component B) | | | | |
| Copolymer content | wt % | 27 | 26 | 27 |
| Ethylene content in component b) | wt % | 55 | 41 | 51 |
| Intrinsic viscosity of the Xylene soluble fraction | dl/g | 2.7 | 2.6 | 2.6 |
| Property of the composition | | | | |
| Xylene - soluble fraction | wt % | 22.8 | 23 | 24 |
| MFR | g/10' | 17 | 17.1 | 18.7 |
| Elmendorf machine direction | gf | 330 | 192 | 142 |
| Elmendorf transverse direction | gf | 185 | 193 | 112 |
| Oligomer content | ppm | 1125 | 995 | 1300 |

What is claimed is:

1. A film comprising:
   a polypropylene composition comprising
   A) from 50 wt % to 90 wt %; of a propylene homopolymer having a fraction insoluble in xylene at 25° C., higher than 90%; and a MFR L (Melt Flow Rate according to ISO 1133, condition L, at 230° C. and 2.16 kg load) from 0.5 to 200 g/10 min; and
   B) from 10 wt % to 50 wt %; of a copolymer of propylene and ethylene having from 30.0 wt % to 70.0 wt %, of ethylene derived units, based upon the total weight of the copolymer;
   wherein
   the sum of the amount of component A) and B) being 100;
   the polypropylene composition having:
   i) an intrinsic viscosity of the fraction soluble in xylene at 25° C. between 2.2 and 4.0 dl/g;
   ii) a MFR L (Melt Flow Rate according to ISO 1133, condition L, at 230° C. and 2.16 kg load) from 0.5 to 50 g/10 min; and
   iii) a xylene soluble fraction ranging from 20 wt % to 50 wt % based upon the total weight of the propylene composition; and
   the polypropylene composition being obtained by a polymerization process comprising the steps of
   step a) polymerizing propylene to obtain component A) in the presence of a catalyst comprising the product of a reaction between:
   a) a solid catalyst component comprising Ti, Mg, Cl, and an internal electron donor compound containing from 0.1 to 50% wt of Bi with respect to the total weight of the solid catalyst component;
   b) an alkylaluminum compound and,
   c) an electron-donor compound (external donor); and
   step b) polymerizing propylene and ethylene to obtain component B) in the presence of the polymerization product of step a).

2. The film according to claim 1, wherein, in the propylene composition, component A) ranges from 60 wt % to 85 wt %; and component B) ranges from 15 wt % to 40 wt %.

3. The film according to claim 1, wherein, in the propylene composition, the MFR L (Melt Flow Rate according to ISO 1133, condition L, at 230° C. and 2.16 kg load) of component A ranges from 10 to 110 g/10 min.

4. The film according to claim 1, wherein, in the propylene composition, the ethylene derived units of component B) ranges from 35.0 wt % to 60.0 wt %, based upon the total weight of the copolymer.

5. The film according to claim 1, wherein, in the propylene composition, the ethylene derived units of component B) ranges from 40.0 wt % to 58.0 wt %, based upon the total weight of the copolymer.

6. The film according to claim 1, wherein the propylene composition has an intrinsic viscosity of the fraction soluble in xylene at 25° C. between 2.3 and 4.0 dl/g.

7. The film according to claim 1, wherein the propylene composition has an intrinsic viscosity of the fraction soluble in xylene at 25° C. between 2.5 and 3.5 dl/g.

8. The film according to claim 1, wherein in the polypropylene composition the xylene soluble fraction ranges from 25 wt % to 35 wt %, based upon the total weight of the propylene composition.

9. The film of claim 1, wherein the film is a cast film.

10. The film of claim 1, wherein the film is a BOPP film.

* * * * *

UNITED STATES PATENT AND TRADEMARK OFFICE
CERTIFICATE OF CORRECTION

| | |
|---|---|
| PATENT NO. | : 10,494,517 B1 |
| APPLICATION NO. | : 16/466453 |
| DATED | : December 3, 2019 |
| INVENTOR(S) | : Cathelin et al. |

It is certified that error appears in the above-identified patent and that said Letters Patent is hereby corrected as shown below:

In the Specification

Column 3, Line 3, after "5 and 150" insert -- μm --
Column 3, Line 4, after "20 to 100" insert -- μm --
Column 3, Line 4, after "30 to 90" insert -- μm --

Signed and Sealed this
Twenty-first Day of June, 2022

Katherine Kelly Vidal
*Director of the United States Patent and Trademark Office*